(12) United States Patent
Liu et al.

(10) Patent No.: US 11,454,203 B2
(45) Date of Patent: Sep. 27, 2022

(54) APPARATUS FOR TESTING SPRAY AND COMBUSTION PERFORMANCE OF INTERNAL-COMBUSTION ENGINES BASED ON RAPID COMPRESSION-EXPANSION MACHINE

(71) Applicant: Harbin Engineering University, Harbin (CN)

(72) Inventors: Long Liu, Harbin (CN); Shihai Liu, Harbin (CN); Dai Liu, Harbin (CN); Jian Zhang, Harbin (CN); Yue Wu, Harbin (CN); Chen An, Harbin (CN); Qihao Mei, Harbin (CN); Wang Yang, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 17/564,589

(22) Filed: Dec. 29, 2021

(65) Prior Publication Data

US 2022/0120250 A1    Apr. 21, 2022

(30) Foreign Application Priority Data

Jul. 15, 2021 (CN) .......................... 202110803705.7

(51) Int. Cl.
*F02M 21/02* (2006.01)
*F02M 65/00* (2006.01)

(52) U.S. Cl.
CPC .......... *F02M 65/00* (2013.01); *F02M 21/023* (2013.01); *F02M 21/0203* (2013.01); *F02M 21/0221* (2013.01)

(58) Field of Classification Search
CPC .............. F02M 65/00; F02M 21/0203; F02M 21/0221; F02M 21/023; G01M 15/04
USPC ..................... 123/585, 525, 198 A; 701/107; 73/114.31, 114.32
See application file for complete search history.

(56) References Cited

FOREIGN PATENT DOCUMENTS

JP            3258954      * 11/1991   ............. F02D 45/00

* cited by examiner

*Primary Examiner* — Hai H Huynh
(74) *Attorney, Agent, or Firm* — IPro, PLLC; Na Xu

(57) ABSTRACT

The present disclosure provides an apparatus for testing spray and combustion performance of an internal-combustion engine based on a rapid compression-expansion machine, which belongs to the testing field of internal-combustion engines. It includes a driving mechanism, a transmission mechanism, an engine cylinder, an air intake system and an exhaust system. The engine cylinder includes a piston, a cylinder block, a dual-fuel cylinder head and a multi-injector assembly. The piston is disposed in the cylinder block. The driving mechanism is connected with the piston through the transmission mechanism and drives the piston to linearly move back and forth along a vertical direction of the cylinder block. The dual-fuel cylinder head is connected to an upper part of the cylinder block. The multi-fuel injection assembly includes a plurality of injectors. The plurality of injectors are of the same type and are all disposed on the dual-fuel cylinder head.

10 Claims, 2 Drawing Sheets

APPARATUS FOR TESTING SPRAY AND COMBUSTION PERFORMANCE OF INTERNAL-COMBUSTION ENGINES BASED ON RAPID COMPRESSION-EXPANSION MACHINE

TECHNICAL FIELD

The present disclosure herein belongs to the testing field of internal-combustion engines, and in particular relates to an apparatus for testing spray and combustion performance of the internal-combustion engine based on a rapid compression-expansion machine.

BACKGROUND

As a kind of traditional power machinery, the two-stroke engine has the advantages of wide power range, high thermal efficiency, strong reliability, convenience in maintenance, high operation safety and long service life. At present, it has become the first choice of marine power. However, its development is restricted by its high energy consumption and serious pollution. In response to the national energy-saving policy, improving the efficiency of internal-combustion engine, reducing the energy consumption and emission have become the development trend of energy-saving internal-combustion power. Therefore, the research on the spray and combustion performance of two-stroke internal-combustion engines has become a major research direction to improve the comprehensive performance of internal-combustion engines.

The research on the combustion performance of internal-combustion engines is generally completed by a combustion simulation apparatus, but the existing rapid compression-expansion apparatus mostly adopts a four-stroke small-cylinder-diameter structure, and can only meet the test requirements of single fuel injection and single injection pressure. Due to the high temperature and pressure in the cylinder of the marine low-speed engine and large internal cylinder space, at present, an optical testing apparatus for spray and combustion tests cannot simulate its thermodynamic and mechanical dynamic performance in a small machine. At the same time, because marine engines usually adopt injection of different fuels and combustion types, the current optical testing apparatus cannot give consideration to both the fuel injection and combustion types of many marine engines.

SUMMARY

In order to solve the problems in the prior art, the present disclosure provides an apparatus for testing spray and combustion performance of the internal-combustion engine based on a rapid compression-expansion machine.

In order to achieve the purpose, the present disclosure adopts the following technical solution: an apparatus for testing spray and combustion performance of the internal-combustion engine based on a rapid compression-expansion machine includes a driving mechanism, a transmission mechanism, an engine cylinder, an air intake system and an exhaust system. The engine cylinder includes a piston, a cylinder block, a dual-fuel cylinder head and a multi-injector assembly. The piston is disposed in the cylinder block, the driving mechanism is connected with the piston through the transmission mechanism and drives the piston to linearly move back and forth along a vertical direction of the cylinder block. The dual-fuel cylinder head is connected to an upper part of the cylinder block. The multi-fuel injection assembly includes a plurality of injectors which are of the same type and are all disposed on the dual-fuel cylinder head. The upper part of the cylinder block is transversely provided with an air intake and an exhaust port. The air intake and the exhaust port are perpendicular to a moving direction of the piston. The air intake system includes an air intake pipeline, an external air tank, a nitrogen bottle group, an air tank, a pressure stabilizing tank and a gas control system. The air intake pipeline is connected with the air intake, the external air tank is connected with the air intake pipeline through a first solenoid valve, the gas control system is connected with the air intake pipeline through a fifth solenoid valve, the pressure stabilizing tank is connected with the air intake pipeline through a fourth solenoid valve, the nitrogen bottle group is connected with the air intake pipeline through a second solenoid valve, the air tank is connected with the air intake pipeline through a third solenoid valve, and the exhaust port is connected with the exhaust system.

Further, the dual-fuel cylinder head is a low-pressure dual-fuel cylinder head or a high-pressure dual-fuel cylinder head.

Further, the multi-injector assembly disposed on the low-pressure dual-fuel cylinder head includes a pilot fuel injector with a pre-combustion chamber, a central main injector and a heavy oil injector. The pilot fuel injector with the pre-combustion chamber, the central main injector and the heavy oil injector are all disposed on a top of the low-pressure dual-fuel cylinder head.

Further, first quartz windows are disposed in front and rear sides of the low-pressure dual-fuel cylinder head.

Further, the multi-injector assembly disposed on the high-pressure dual-fuel cylinder head includes a high-pressure gas injector and a pilot diesel injector. The high-pressure gas injector and the pilot diesel injector are both disposed on a side of the high-pressure dual-fuel cylinder head.

Further, second quartz windows are disposed in a top and sides of the high-pressure dual-fuel cylinder head.

Further, the transmission mechanism includes a flywheel, a crankshaft and a connecting rod, the flywheel is connected with the crankshaft. The crankshaft is connected with one end of the connecting rod, and the other end of the connecting rod is connected with the piston.

Further, the driving mechanism includes a motor and a reducer. An output end of the motor is connected with an input end of the reducer, an output end of the reducer is connected with a coupling through a flange plate, the coupling is connected with an intermediate shaft, and the intermediate shaft is connected with the flywheel through an external bearing support.

Further, the exhaust system includes an exhaust pipeline and an exhaust gas storage tank. One end of the exhaust pipeline is connected with the exhaust port, and the other end is connected with the exhaust gas storage tank.

Further, a mass balance part is disposed in the cylinder block, a heater is provided on the pressure stabilizing tank, and a pressure sensor and a temperature sensor are mounted on the dual-fuel cylinder head.

Compared with the prior art, the present disclosure has the following beneficial effects: the present disclosure solves the problems that the existing test of the internal-combustion engine testing apparatus having a complex structure, is poor in adaptability, cannot be observed easily, and cannot meet the requirements of multi-fuel injection and multi-injection-pressure tests. The purpose of the testing apparatus provided by the present disclosure is to conduct in-depth research on high- and low-pressure dual-fuel and diesel spray and combustion performance of large-cylinder-diameter long-stroke marine engines. A visualized testing apparatus for simulating injection and combustion of a marine two-stroke engine using a four-stroke single-cylinder engine by adjusting the temperature and pressure of the compression stroke is provided.

The present disclosure mainly uses the driving mechanism such as the motor to drive the piston to move, uses high-pressure and high-temperature intake air to simulate the pressure and temperature change in the cylinder of the marine engine, provides an ideal test means for simulating the compression and ignition process of the marine low-speed engine, and meets the requirements of simulating its thermodynamic and mechanical dynamic performance. By replacing with the cylinder head part to meet the requirements of high- and low-pressure dual-fuel injection, simulating the spray and combustion tests of different diesel fuels, observing the spray and combustion phenomena through the visual windows of the testing apparatus, and recording the test data, the observation of various fuel injection forms is realized.

The present disclosure uses the cylinder block, crankshaft, connecting rod and piston mechanism of the engine to drive the crankshaft through the motor to realize the rapid movement of the piston; the high-temperature and high-pressure air intake system can be used to simulate the pressure and temperature requirements in the cylinder of the two-stroke engine; the high- and low-pressure dual-fuel combustion mode can be realized by using the gas control system and solenoid valve; the spray and combustion simulation in the dual-fuel mode, the pure-diesel mode and the pure-diesel multi-injector mode can be realized by using the multi-injector assembly on the cylinder head with different structures, and the multi-fuel adaptability is high; the test data can be observed and recorded by using the ultra-large visual quartz windows in the cylinder head, thus achieving the effect of comprehensively analyzing the spray and combustion process.

1—motor, 2—reducer, 3—coupling, 4—flywheel, 5—mass balance part, 6—crankshaft, 7—connecting rod, 8—piston, 9—cylinder block, 10—low-pressure dual-fuel cylinder head, 11—external air tank, 12—first solenoid valve, 13—second solenoid valve, 14—nitrogen bottle group, 15—air tank, 16—third solenoid valve, 17—pressure stabilizing tank, 18—fourth solenoid valve, 19—fifth solenoid valve, 20—gas control system, 21—air intake, 22—pilot fuel injector with pre-combustion chamber, 23—central main injector, 24—heavy oil injector, 25—first quartz window, 26—exhaust port, 27—exhaust gas storage tank, 28—high-pressure dual-fuel cylinder head, 29—high-pressure gas injector, 30—pilot diesel injector, 31—second quartz window.

DETAILED DESCRIPTION

The technical solutions in examples of the present disclosure will be clearly and completely explained below in conjunction with the drawings in the examples of the present disclosure.

Figure 1:
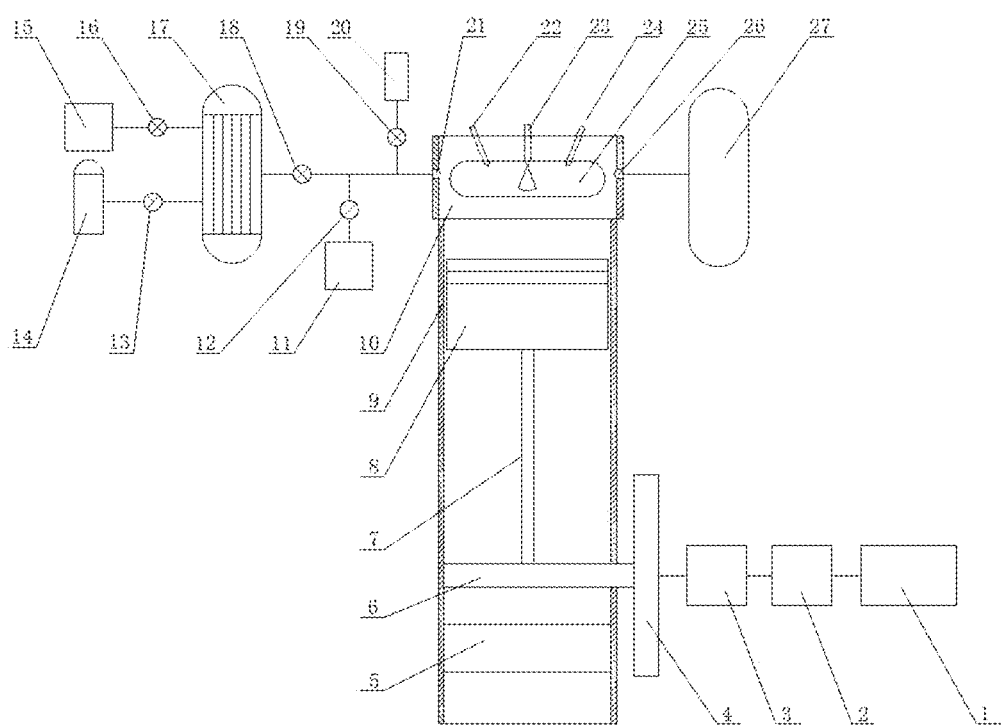
FIG. 1 is a schematic structural diagram of an apparatus for testing spray and combustion performance of the internal-combustion engine based on a rapid compression-expansion machine according to the present disclosure.
Figure 2:
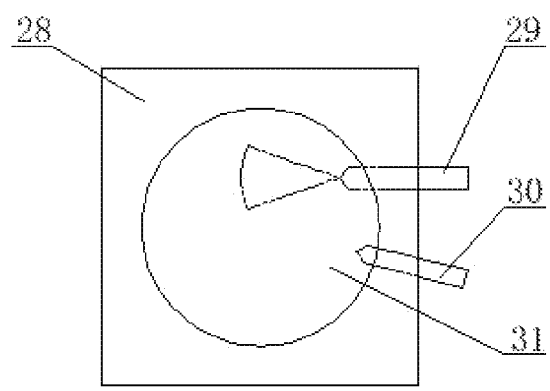
FIG. 2 is a schematic structural diagram of connection of a high-pressure dual-fuel cylinder head according to the present disclosure.

The implementation mode will be described with reference to FIGS. 1-2. An apparatus for testing spray and combustion performance of the internal-combustion engine based on a rapid compression-expansion machine includes a driving mechanism, a transmission mechanism, an engine cylinder, an air intake system and an exhaust system, the engine cylinder includes a piston 8, a cylinder block 9, a dual-fuel cylinder head and a multi-injector assembly. The piston 8 is disposed in the cylinder block 9, the driving mechanism is connected with the piston 8 through the transmission mechanism and drives the piston 8 to linearly move back and forth along a vertical direction of the cylinder block 9. The dual-fuel cylinder head is connected to an upper part of the cylinder block 9. The multi-fuel injection assembly includes a plurality of injectors which are of the same type and are all disposed on the dual-fuel cylinder head. The upper part of the cylinder block 9 is transversely provided with an air intake 21 and an exhaust port 26. The air intake 21 and the exhaust port 26 are perpendicular to a moving direction of the piston 8. The air intake system includes an air intake pipeline, an external air tank 11, a nitrogen bottle group 14, an air tank 15, a pressure stabilizing tank 17 and a gas control system 20. The air intake pipeline is connected with the air intake 21, the external air tank 11 is connected with the air intake pipeline through a first solenoid valve 12, the gas control system 20 is connected with the air intake pipeline through a fifth solenoid valve 19, the pressure stabilizing tank 17 is connected with the air intake pipeline through a fourth solenoid valve 18, the nitrogen bottle group 14 is connected with the air intake pipeline through a second solenoid valve 13, the air tank 15 is connected with the air intake pipeline through a third solenoid valve 16, and the exhaust port 26 is connected with the exhaust system.

In the present example, the transmission mechanism includes a flywheel 4, a crankshaft 6 and a connecting rod 7. The flywheel 4 is connected with the crankshaft 6, the crankshaft 6 is connected with one end of the connecting rod 7, and the other end of the connecting rod 7 is connected with the piston 8. The driving mechanism includes a motor 1 and a reducer 2, an output end of the motor 1 is connected with an input end of the reducer 2, an output end of the reducer 2 is connected with a coupling 3 through a flange plate, the coupling is connected with an intermediate shaft, and the intermediate shaft is connected with the flywheel 4 through an external bearing support. In order to realize the mechanical power needed for simulating the spray and combustion of the marine low-speed engine, the motor 1 and the reducer 2 are connected to realize deceleration and increase torsion. Through the movement of the crankshaft 6 and the connecting rod 7, the piston 8 is driven to linearly move back and forth in a vertical direction. In order to reduce the jitter generated during operation, in the present example, a mass balance part 5 is disposed in the cylinder block 9 to ensure that the crankshaft 6 and the engine cylinder can carry out the test smoothly and realize rapid compression-expansion.

In order to realize the temperature and pressure required for simulating the spray and combustion of the marine low-speed engine, the present example adopts a transverse air intake and exhaust system, the air intake 21 and the exhaust port 26 are transversely disposed in a side of the dual-fuel cylinder head in a direction perpendicular to a moving direction of the piston 8, and the external air tank 11, the nitrogen bottle group 14, the air tank 15, the pressure stabilizing tank 17 and the gas control system 20 are connected to a combustion chamber in parallel to provide the engine with intake air at the required temperature and pressure. The gas control system 20 can realize the conversion between the low-pressure mode and the low-pressure dual-fuel injection mode by controlling low-pressure natural gas injection. At the same time, by opening and closing the solenoid valves of the air tank 15, the nitrogen bottle group 14 and the pressure stabilizing tank 17, and the heater on the pressure stabilizing tank 17, the requirement of the fresh working medium in the cylinder under different tests of spray and combustion can be met. The exhaust system includes an exhaust pipeline and an exhaust gas storage tank 27, one end of the exhaust pipeline is connected with the exhaust port 26, the other end is connected with the exhaust gas storage tank 27, and exhaust gas is discharged from the exhaust pipeline directly through the piston movement and finally enters the exhaust gas storage tank 27.

In order to achieve observation of spray and combustion of high- and low-pressure dual-fuel and different types of diesel fuels, the present example adopts two sets of visual cylinder heads, which are respectively a low-pressure dual-fuel cylinder head 10 and a high-pressure dual-fuel cylinder head 28. Different forms of multi-injector assemblies are provided on the low-pressure dual-fuel cylinder head 10 and the high-pressure dual-fuel cylinder head 28, which can realize a dual-fuel mode, a pure-diesel mode and a pure-diesel multi-injector mode. A pressure sensor and a temperature sensor are mounted on the dual-fuel cylinder head. The multi-injector assembly disposed on the low-pressure dual-fuel cylinder head 10 includes a pilot fuel injector 22 with a pre-combustion chamber, a central main injector 23 and a heavy oil injector 24. The pilot fuel injector 22 with the pre-combustion chamber, the central main injector 23 and the heavy oil injector 24 are all disposed on a top of the low-pressure dual-fuel cylinder head 10, which can realize mixed injection requirements of various fuels such as diesel, heavy oil and natural gas in marine engines. First quartz windows 25 are disposed in front and rear sides of the low-pressure dual-fuel cylinder head 10. The multi-injector assembly disposed on the high-pressure dual-fuel cylinder head 28 includes a high-pressure gas injector 29 and a pilot diesel injector 30. The high-pressure gas injector 29 and the pilot diesel injector 30 are both disposed on a side of the high-pressure dual-fuel cylinder head 28. Second quartz windows 31 are provided in a top and sides of the high-pressure dual-fuel cylinder head 28. Visual cylinder head design can be used to observe and record the spray and combustion situation, thus achieving the effect of comprehensively analyzing the spray development process. In the test, the spray and combustion in the cylinder can be observed through the quartz glass windows, and the data recording is completed.

During operation, firstly, the motor 1 drives the piston 8 to move back and forth through the transmission mechanism to control the opening and closing of each solenoid valve in the air intake system, so as to feed air or nitrogen into the pressure stabilizing tank 17 according to a certain amount for heating, which is fed into the cylinder of the engine after the pressure and temperature in the cylinder reach the required target values. In the simulation of low-pressure dual-fuel test, the air injected by the air intake pipeline and the natural gas injected by the gas control system 20 are mixed and enter the combustion chamber in the cylinder block 9 together, pilot diesel is injected by the pilot fuel injector 22 with the pre-combustion chamber on the low-pressure dual-fuel cylinder head 10 to ignite the natural gas mixture in the combustion chamber; the central main injector 23 and the heavy oil injector 24 on the low-pressure dual-fuel cylinder head 10 may also be used for the spray and combustion tests of light diesel oil and marine heavy oil. In the simulation of high-pressure dual-fuel test, the gas control system 20 closes the injection, the high-pressure dual-fuel is injected into the combustion chamber by the high-pressure gas injector 29 and the pilot diesel injector 30, and the pre-injected diesel ignites the high-pressure natural gas. The spray and combustion situation in the cylinder is continuously recorded through visual windows and pressure and temperature sensors on the dual-fuel cylinder head. After the test, the exhaust gas is discharged from the exhaust pipeline to the exhaust gas storage tank 27.

The specific working flow is as follows:

When the test apparatus starts working, the circulating cooling water and lubricating oil in the testing apparatus are firstly heated for preheating. Then, the motor 1 drives an input shaft of the reducer 2 to rotate. Power is output after deceleration and increase torsion by the reducer 2. The output shaft of the reducer is connected with the flywheel 4 through the coupling 3 to realize the rotation of the flywheel 4. The flywheel 4 drives the crankshaft 6 to rotate. The crankshaft 6 drives the connecting rod 7 to push the piston 8 to linearly move back and forth in the cylinder block 9. In order to reduce the influence of the vibration in the working process on the test, the testing apparatus adopts the mass balance part 5 for adjustment to ensure the smooth operation of the driving mechanism.

According to the test conditions of the two-stroke engine, the air intake system provides the required normal-temperature and normal-pressure, and high-temperature and high-pressure intake air for the cylinder block 9. After the cooling water and lubricating oil in the testing apparatus are heated, the first solenoid valve 12 is opened, all other solenoid valves are closed, and the air in the room-temperature state in the external air tank 11 is absorbed into the cylinder block 9 through the air intake 21 under the action of the movement of the piston 8. At the same time, by controlling the second solenoid valve 13 and the third solenoid valve 16, a certain amount of intake gas or air in the nitrogen bottle group 14 or the air tank 15 is introduced into the pressure stabilizing tank 17 with the heater and heated to the specified temperature. When the temperature in the air tank 15 and the temperature of the glass windows of the apparatus reach the stable target temperature, the fourth solenoid valve 18 is opened and the first solenoid valve 12 is closed to start the test.

When the spray test is carried out, the second solenoid valve 13 is opened, the third solenoid valve 16 is closed, and the gas in the nitrogen bottle group 14 enters the pressure stabilizing tank 17 with the heater. After the nitrogen is heated to the temperature and pressure required by the test, the fourth solenoid valve 18 is opened, so that the nitrogen enters the cylinder block 9 through the air intake 21. When the combustion test is carried out, the third solenoid valve 16 is opened, the second solenoid valve 13 is closed, and the air in the air tank 15 enters the pressure stabilizing tank 17 for heating and enters the cylinder block 9 through the air intake 21 after the test requirement is met.

Through the test control system, the fuel is injected into the second cycle through the multi-injector assembly on the dual-fuel cylinder head, and the spray and combustion state in the cylinder block 9 is observed by using cameras through the quartz windows in the cylinder head. In the present example, the high- and low-pressure dual-fuel injection and the injection and combustion of different fuels are completed by replacing with two sets of low-pressure dual-fuel cylinder head 10 and high-pressure dual-fuel cylinder head 28 with different structures and controlling the fifth solenoid valve 19 between the gas control system 20 and the air intake 21. The specific embodiment solution is as follows:

When the low-pressure dual-fuel and different pure-diesel spray and combustion tests are carried out, the low-pressure dual-fuel cylinder head 10 is used, the fifth solenoid valve 19 is opened, the gas control system 20 is controlled to mix a certain amount of natural gas with the gas output from the pressure stabilizing tank 17, the mixture enters the cylinder block 9 through the air intake 21, and a small amount of diesel is injected into the pre-combustion chamber of the pilot fuel injector 22. And then the flame formed in pre-chamber can be jetted into the upper end of cylinder block 9 which could ignite the natural gas mixture to complete ignition combustion. When the low-pressure dual-fuel cylinder head 10 is used for pure-diesel spray and combustion tests, the fifth solenoid valve 19 is closed, the heated air or nitrogen from the pressure stabilizing tank 17 enters the cylinder block 9 through the air intake 21. The low-pressure dual-fuel cylinder head 10 is equipped with two different structures of central main injector 23 and heavy oil injector 24 for pure-diesel tests. The central main injector 23 is used for the injection of light diesel oil. The heavy oil injector 24 is used for spraying marine heavy oil. According to the test demand, different injectors are selected for diesel fuel injection to realize the spray or combustion tests of different models of diesel oil. During the tests, observation and recording may be carried out through the two first quartz windows 25 in the low-pressure dual-fuel cylinder head 10.

When the high-pressure dual-fuel spray and combustion tests are carried out, the high-pressure dual-fuel cylinder head 28 is used, the fifth solenoid valve 19 is closed, the heated air or nitrogen from the pressure stabilizing tank 17 enters the cylinder block 9 through the air intake 21, and the pilot diesel injector 30 sprays a small amount of diesel into the cylinder. Subsequently, the high-pressure gas injector 29 injects high-pressure natural gas into the cylinder, which is ignited by the burning diesel to complete the spray or combustion test. Since the two injectors are mounted on the side of the high-pressure dual-fuel cylinder head 28, an ultra-large visual second quartz window 31 is designed in the upper end of the high-pressure dual-fuel cylinder head 28, through which the spray and combustion process of high-pressure dual-fuel can be observed and recorded comprehensively.

When the third cycle starts, the fuel injection is stopped, the fourth solenoid valve 18 is closed, the first solenoid valve 12 is opened, and the motoring speed of the motor 1 decreases slowly until it stops. At the same time, the exhaust port 26 is opened, the exhaust gas is pushed out of the cylinder block 9 by the upwards moving piston 8 and enters the exhaust gas storage tank 27, and the first solenoid valve 12 is closed, thus completing the whole process of the test.

The apparatus for testing spray and combustion performance of internal-combustion engines based on a rapid compression-expansion machine provided by the present disclosure are described in detail. The principle and the implementation mode of the present disclosure are described by applying specific examples, and the description of the examples is only used for helping to understand the method and the core idea of the method; and meanwhile, to those of ordinary skill in the art, changes will be made in the specific implementation mode and scope of application in accordance with the spirit of the present disclosure. In conclusion, this specification should not be construed as limiting the present disclosure.

What is claimed is:

1. An apparatus for testing spray and combustion performance of an internal-combustion engine based on a rapid compression-expansion machine, wherein the apparatus comprises a driving mechanism, a transmission mechanism, an engine cylinder, an air intake system and an exhaust system, the engine cylinder comprises a piston (8), a cylinder block (9), a dual-fuel cylinder head and a multi-injector assembly, wherein the piston (8) is disposed in the cylinder block (9), the driving mechanism is connected with the piston (8) through the transmission mechanism and drives the piston (8) to linearly move back and forth along a vertical direction of the cylinder block (9), the dual-fuel cylinder head is connected to an upper part of the cylinder block (9), a multi-fuel injection assembly comprises a plurality of injectors, the plurality of injectors are of the same type and are all disposed on the dual-fuel cylinder head, the upper part of the cylinder block (9) is transversely provided with an air intake (21) and an exhaust port (26), the air intake (21) and the exhaust port (26) are perpendicular to a moving direction of the piston (8), the air intake system comprises an air intake pipeline, an external air tank (11), a nitrogen bottle group (14), an air tank (15), a pressure stabilizing tank (17) and a gas control system (20), the air intake pipeline is connected with the air intake (21), the external air tank (11) is connected with the air intake pipeline through a first solenoid valve (12), the gas control system (20) is connected with the air intake pipeline through a fifth solenoid valve (19), the pressure stabilizing tank (17) is connected with the air intake pipeline through a fourth solenoid valve (18), the nitrogen bottle group (14) is connected with the air intake pipeline through a second solenoid valve (13), the air tank (15) is connected with the air intake pipeline through a third solenoid valve (16), and the exhaust port (26) is connected with the exhaust system.

2. The apparatus for testing spray and combustion performance of the internal-combustion engine based on a rapid compression-expansion machine according to claim 1, wherein the dual-fuel cylinder head is a low-pressure dual-fuel cylinder head (10) or a high-pressure dual-fuel cylinder head (28).

3. The apparatus for testing spray and combustion performance of the internal-combustion engine based on a rapid compression-expansion machine according to claim 2 wherein the multi-injector assembly disposed on the low-pressure dual-fuel cylinder head (10) comprises a pilot fuel injector (22) with a pre-combustion chamber, a central main injector (23) and a heavy oil injector (24), and the pilot fuel injector (22) with the pre-combustion chamber, the central main injector (23) and the heavy oil injector (24) are all disposed on a top of the low-pressure dual-fuel cylinder head (10).

4. The apparatus for testing spray and combustion performance of the internal-combustion engine based on a rapid compression-expansion machine according to claim 3, wherein first quartz windows (25) are disposed on front and rear sides of the low-pressure dual-fuel cylinder head (10).

5. The apparatus for testing spray and combustion performance of the internal-combustion engine based on a rapid compression-expansion machine according to claim 2, wherein the multi-injector assembly disposed on the high-pressure dual-fuel cylinder head (28) comprises a high-pressure gas injector (29) and a pilot diesel injector (30), and the high-pressure gas injector (29) and the pilot diesel injector (30) are both disposed on a side of the high-pressure dual-fuel cylinder head (28).

6. The apparatus for testing spray and combustion performance of the internal-combustion engine based on a rapid compression-expansion machine according to claim 5, wherein second quartz windows (31) are disposed on a top and sides of the high-pressure dual-fuel cylinder head (28).

7. The apparatus for testing spray and combustion performance of the internal-combustion engine based on a rapid compression-expansion machine according to claim 1, wherein the transmission mechanism comprises a flywheel (4), a crankshaft (6) and a connecting rod (7), the flywheel (4) is connected with the crankshaft (6), the crankshaft (6) is connected with one end of the connecting rod (7), and the other end of the connecting rod (7) is connected with the piston (8).

8. The apparatus for testing spray and combustion performance of the internal-combustion engine based on a rapid compression-expansion machine according to claim 7, wherein the driving mechanism comprises a motor (1) and a reducer (2), an output end of the motor (1) is connected with an input end of the reducer (2), an output end of the reducer (2) is connected with a coupling (3) through a flange plate, the coupling is connected with an intermediate shaft, and the intermediate shaft is connected with the flywheel (4) through an external bearing support.

9. The apparatus for testing spray and combustion performance of the internal-combustion engine based on a rapid compression-expansion machine according to claim 1, wherein the exhaust system comprises an exhaust pipeline and an exhaust gas storage tank (27), one end of the exhaust pipeline is connected with the exhaust port (26), and the other end is connected with the exhaust gas storage tank (27).

10. The apparatus for testing spray and combustion performance of the internal-combustion engine based on a rapid compression-expansion machine according to claim 1, wherein a mass balance part (5) is disposed in the cylinder block (9), a heater is provided on the pressure stabilizing tank (17), and a pressure sensor and a temperature sensor are mounted on the dual-fuel cylinder head.

\* \* \* \* \*